US012330915B2

(12) United States Patent
Sonnenmoser et al.

(10) Patent No.: US 12,330,915 B2
(45) Date of Patent: Jun. 17, 2025

(54) ELEVATOR SYSTEM HAVING A CIRCUIT WITH A SWITCH MONITORED BY MEANS OF AN AC VOLTAGE SIGNAL

(71) Applicant: Inventio AG, Hergiswil (CH)

(72) Inventors: Astrid Sonnenmoser, Hochdorf (CH); Ivo Lustenberger, Buttisholz (CH); Kurt Heinz, Buchs (CH); Thomas Hartmann, Kleinwangen (CH)

(73) Assignee: INVENTIO AG, Hergiswil (CH)

( * ) Notice: Subject to any disclaimer, the term of this patent is extended or adjusted under 35 U.S.C. 154(b) by 1815 days.

(21) Appl. No.: 16/344,072

(22) PCT Filed: Oct. 25, 2017

(86) PCT No.: PCT/EP2017/077234
§ 371 (c)(1),
(2) Date: Apr. 23, 2019

(87) PCT Pub. No.: WO2018/077918
PCT Pub. Date: May 3, 2018

(65) Prior Publication Data

US 2019/0263628 A1 Aug. 29, 2019

(30) Foreign Application Priority Data

Oct. 27, 2016 (EP) .................................... 16195923

(51) Int. Cl.
*B66B 5/00* (2006.01)
*B66B 1/30* (2006.01)
*B66B 13/22* (2006.01)

(52) U.S. Cl.
CPC .............. *B66B 5/0018* (2013.01); *B66B 1/30* (2013.01); *B66B 5/0031* (2013.01); *B66B 13/22* (2013.01)

(58) Field of Classification Search
CPC ........... B66B 1/30; B66B 1/308; B66B 13/22; B66B 5/0018; B66B 1/3446; B66B 11/04;
(Continued)

(56) References Cited

U.S. PATENT DOCUMENTS 5,523,633 A 6/1996 Imaizumi et al.
7,350,624 B2 4/2008 Deplazes et al.
(Continued)

FOREIGN PATENT DOCUMENTS

CN 1051895 A 6/1991
CN 1586033 A 2/2005
(Continued)

*Primary Examiner* — Jeffrey Donels
(74) *Attorney, Agent, or Firm* — William J. Clemens; Shumaker, Loop & Kendrick, LLP

(57) ABSTRACT

An elevator system controller controls a drive and optionally further elevator components. The controller includes a circuit having a switch to be monitored, the switch having an input and an output, a signal transmitter unit applying an AC voltage input signal to the input of the switch, and a monitoring unit to record an output signal at an output of the switch. On the basis of a comparison of the output signal with the input signal, the circuit generates a monitoring signal that indicates a switching state of the switch. The switch may be, for example, a door switch connected in series with other safety switches to form a safety chain. Applying the AC voltage signal instead of a conventional DC voltage signal makes it possible to avoid electrical corrosion in the switch and also makes it possible to increase a reliability of a detected switching state of the switch.

14 Claims, 3 Drawing Sheets

(58) Field of Classification Search
CPC ....... B66B 3/00; B66B 1/3423; B66B 1/3461; B66B 1/00; B66B 5/0006; B66B 7/064; B66B 13/16
See application file for complete search history.

(56) References Cited

U.S. PATENT DOCUMENTS

| | | | |
|---|---|---|---|
| 8,820,482 | B2 | 9/2014 | De Coi et al. |
| 10,526,169 | B2 | 1/2020 | Muller et al. |

FOREIGN PATENT DOCUMENTS

| | | | | | |
|---|---|---|---|---|---|
| CN | 100468937 | C | | 3/2009 | |
| CN | 100590051 | C | | 2/2010 | |
| CN | 103159103 | A | | 6/2013 | |
| CN | 205312843 | U | | 6/2016 | |
| CN | 107265226 | A | | 10/2017 | |
| JP | H11292436 | A | | 10/1999 | |
| KR | 20070097098 | A | * | 10/2007 | |
| KR | 20110050375 | A | * | 5/2011 | |
| WO | 2005000727 | A1 | | 1/2005 | |
| WO | WO-2005073121 | A2 | * | 8/2005 | ............. B66B 1/308 |
| WO | WO-2006108433 | A1 | * | 10/2006 | ............. B66B 13/22 |
| WO | 2011133163 | A1 | | 10/2011 | |
| WO | WO-2012164597 | A1 | * | 12/2012 | |
| WO | 2013178872 | A1 | | 12/2013 | |
| WO | WO-2014124780 | A1 | * | 8/2014 | ............. B66B 13/22 |
| WO | 2016096269 | A1 | | 6/2016 | |
| WO | WO-2018077918 | A1 | * | 5/2018 | ............... B66B 1/30 |
| WO | WO-2019185354 | A1 | * | 10/2019 | |

* cited by examiner

ELEVATOR SYSTEM HAVING A CIRCUIT WITH A SWITCH MONITORED BY MEANS OF AN AC VOLTAGE SIGNAL

FIELD

The present invention relates to an elevator system comprising a specially designed control means for implementing control functions within the elevator system.

BACKGROUND

In an elevator system, an elevator car is moved between different levels or floors of a building by means of a drive. In this context, movements of the elevator car or operation of a drive that conveys the elevator car are controlled by a control means.

The control means can in this case actively control elevator components such as a motor of the drive, in order to move the elevator car to desired floors, for example. For this purpose, the control means can control a supply of energy from an energy source to the drive, for example. The drive is generally driven by means of an electric motor, and therefore the control means controls or regulates a power supply to the electric motor. One or more switches can be provided between the electrical energy source and the electric motor for this purpose, which switches are designed, for example, as power switches for switching high powers, are sometimes referred to as contactors, and which can be closed, controlled by the control means, when the drive is intended to move the elevator car. In this case it should be possible for an actual closure state of these switches to be monitored by the control means.

The control means can also monitor environmental conditions, in particular safety-related conditions, inside the elevator system and take these into account when controlling the elevator functions. For example, the control means can monitor, continuously or in short time intervals, whether all the components of the elevator and therefore the entire elevator system are in a safe state, so that the elevator car can be moved safely.

For example, the control means can monitor whether the car door and all shaft doors are closed correctly. For this purpose, door switches can be provided on the doors of the elevator car and on each of the shaft doors, which switches transition into an associated closure state depending on whether the relevant doors are open or closed. The different door switches can be connected in series and thus form a safety circuit. For example, the safety circuit can then only be closed when all of the door switches housed therein, and optionally also further safety switches integrated therein, are closed. The control means can monitor a state of the safety circuit and, for example, only allow the elevator car to move when the safety circuit is closed.

It has been observed that switches contained in a circuit of a control means of an elevator system partially degrade over time. In particular, switches by means of which only low electrical powers are switched, such as door switches or monitoring switches, tend over time to occupy defective switching states. For example, functional degradation may result in a switch that has been switched into a closed state undesirably conducting an electrical current between an input and an output of the switch.

It has also been observed that a switching state of switches of this kind could not be reliably detected or verified under particular conditions. For example, an attempt has been made to monitor, continuously or in time intervals, a current switching state of the switch by means of the control means or other devices, in order to detect, for example, whether the switch is closed. However, this could lead to misdiagnoses, i.e. a switch that is actually closed, for example, is wrongly detected as being open, as a result of which the availability of the elevator can be impaired.

EP 28 553 23 A1 discloses a braking method for controlling an elevator, wherein a solid-state circuit is provided for supplying electrical power from a DC intermediate circuit which drives the car of the elevator. In this context, a brake controller is controlled by means of a pulse signal. However, in this case the pulse signal is used to overcome a possible fault caused by dirt on an electrical contact, and thereby to be able to correctly switch the brake controller. One disadvantage is that, due to electrical polarity which is oriented in a particular direction, electrical corrosion would often occur on the metal contact of the brake controller because only one DC voltage or one direct current is applied to the brake controller. CN 205 312 843 U discloses a circuit for supplying power for an elevator car door. Two optocouplers are connected in series with one another at the output of the circuit in order to reduce the disadvantageous effect of the corrosion in the circuit.

SUMMARY

There may therefore be a need for an elevator system in which the previously mentioned problems in particular are prevented or at least reduced. In particular, there may be a need for an elevator system in which a circuit that forms part of a control means has at least one switch and the circuit is thereby designed such that a switching state of the switch can be reliably detected over the long term.

According to one aspect of the invention, an elevator system is described which has an elevator car, a drive for driving the elevator car and a control means for controlling at least the drive and optionally further elevator components. The control means comprises a circuit which has a switch to be monitored, a signal transmitter unit and a monitoring unit. The switch to be monitored has an input and an output. The signal transmitter unit is designed to apply an AC voltage signal as an input signal to the input of the switch to be monitored. The monitoring unit is designed to record an output signal applied to the output of the switch to be monitored and, on the basis of a comparison of the output signal with the input signal, to generate a monitoring signal which indicates a current closure state of the switch to be monitored.

Possible features and advantages of embodiments of the invention may be considered, inter alia and without limiting the invention, to be dependent upon the concepts and findings described below.

As already noted in the introduction, degradation has been observed in switches which are connected in a circuit of an elevator system, to the effect that the switching state of said switches could no longer be reliably controlled over time and/or the current switching state thereof could no longer be reliably detected.

It has been recognized that the former problem stems from the fact that, in simple mechanical switches, two different switching states are usually implemented by electrically conductive structures being mechanically brought into contact or being mechanically separated from one another, in order to generate an electrically closed state or an electrically open state, respectively. Over time, however, electrically isolating layers such as oxide layers can form on surfaces of the electrically conductive structures, for example due to electrical corrosion, and these layers can prevent reliable electrical contact between the electrically conductive structures. Expensive switches or contactors of an elevator system then often have to be replaced.

It has also been recognized that the latter problem stems from the fact that, conventionally, a current switching state of a switch is often detected by applying an electrical voltage to an input of the switch and monitoring whether an electrical current subsequently appears through the switch or not, or whether a corresponding resulting electrical voltage is applied at the output of the switch. However, in this case it cannot reliably be determined whether the appearance or lack of the electrical current or the resulting electrical voltage at the output is caused by the applied electrical voltage, or whether other causes such as defective ground faults, short circuits, leakage currents or the like are responsible.

Moreover, continuously applying a DC voltage to the switch could contribute, in particular on the electrically conductive structures thereof, to electrical corrosion and therefore to forming electrically isolating layers therebetween.

The aforementioned problems occur in particular in switches by means of which low electrical powers of less than 50 W, in particular less than 10 W or even less than 2 W, are switched in the elevator system and/or which are designed as mechanical switches. For example, although the switch to be monitored can be designed to switch considerably higher powers, it can actually only be used to switch low powers in the elevator system. In particular in switches to be monitored of this kind, during operation electrically isolating layers can form, for example caused by electrical corrosion, on structures to be mechanically and electrically contacted, such as metal structures, with it being possible for the electrically isolating layers to become thicker over time and to ultimately lead to electrical contact inside the switch being completely broken. Whereas in high power switches, which often switch powers in the range of several kilowatts, sparks or arcs that can virtually explosively remove any previously formed oxide layer are often briefly formed during a switching process, oxide layers of this kind cannot be removed in the switches to be monitored during normal operation as a result of the low powers to be switched and can therefore become increasingly thicker.

It should be noted that, in the present text, the terms “switch” and “switch to be monitored” are used synonymously, whereas other types of switches such as power switches for switching a power supply in order to drive the elevator system are specially referred to as such or as “further switches”.

The two aforementioned problems can be alleviated in the elevator system proposed herein. One main concept can in this case be considered that of applying an AC voltage signal to the input of the switch in order to monitor the current switching state of the switch by means of a signal transmitter unit, instead of conventionally applying a constant voltage, i.e. a DC voltage, and that of then monitoring an output signal produced at the output of the switch by means of a monitoring unit and comparing this signal with the desired switching state, which can for example correlate to the input signal or be dependent thereon.

In the event that the output signal matches the desired switching state in a predefined manner or at least correlates thereto in a defined manner, it can be assumed with very high probability that the switch is in a closed state. Otherwise, it can be assumed that the switch is in its open state. Correspondingly, a monitoring signal can be generated and output by the monitoring unit, which signal communicates, for example to the elevator system, the relevant information on the switching state for example in a power supply or a safety chain of the elevator system.

Applying an AC voltage signal instead of a conventionally used DC voltage signal in the circuit can entail at least two advantages in this case.

Firstly, detecting a corresponding AC voltage signal at the output of the switch by means of the monitoring unit can determine, with very high reliability, that the switch is actually closed. In particular, matches with the applied AC voltage input signal with respect to a frequency response or a pulse duration of the detected output signal can then only be assumed if an electrical connection between the input of the switch and the output thereof is actually caused by the closed switch. In all probability, any errors in the switch, such as insufficient electrical contact between internal conductive structures due to interposed isolating structures, any short circuits or ground faults, any leakage currents, or the like, cannot generate a corresponding AC voltage output signal. At least the closed state of the switch can therefore be detected with very high reliability, and this is essential for safely operating the elevator system, in particular if the switch is part of a safety chain of the elevator system.

Secondly, applying an AC voltage signal to the switch can prevent or at least reduce any electrical corrosion of the conductive structures thereof.

This applies in particular if, according to one embodiment of the invention, the signal transmitter unit is designed to generate the AC voltage signal so as to have a periodically reversing electrical voltage. In other words, the signal transmitter unit is intended to generate the AC voltage signal so as to have a temporally changing sign, such that temporarily a positive voltage and temporarily a negative voltage is applied to the switch. Repeatedly reversing the applied voltage can contribute to preventing electrical corrosion.

Particularly if, according to one embodiment of the invention, the signal transmitter unit is designed to generate the AC voltage signal so as to have positive and negative amplitudes that are symmetrical with respect to a 0V potential, electrical corrosion phenomena can be greatly reduced. In other words, the AC voltage signal can preferably be generated by the signal transmitter unit such that the maximum positive voltages are equal to the maximum negative voltages, a time voltage curve preferably being intended to be set so as to be symmetrical to the 0V potential. As a result, the electrically conductive structures of the switch are subjected to both positive and negative electrical voltages for equally long and as equally strongly. Electrochemically-caused reactions can in this case each largely be undone when reversing the electrical voltage in each case, such that in total hardly any electrical corrosion can occur.

According to one embodiment, the signal transmitter unit is designed to generate the AC voltage signal so as to have a temporally varying period. In other words, the AC voltage signal to be applied to the input of the switch is not generated by the signal transmitter unit so as to have a temporally constant period, i.e. so as to have a fixed frequency, but this period or the frequency are instead varied over time.

By the monitoring unit comparing the output signal that occurs at the output of the switch with the applied input signal not only with respect to the amplitude thereof but also with respect to the period or frequency thereof, it can be even more securely determined whether the switch is in its closed state or not and the monitoring signal to be generated by the monitoring unit can be generated with even higher reliability.

According to one embodiment, the signal transmitter unit comprises a first microcontroller for generating an electrical signal having a temporally varying amplitude, an output terminal and a capacitor which is electrically connected at one end to the first microcontroller and at the other end to the output terminal and is designed to form a galvanic isolation between the first microcontroller and the output terminal. The monitoring unit in this case has a second microcontroller for analyzing an electrical signal that has temporally varying amplitude, and an input terminal which is electrically connected to the second microcontroller. The output terminal of the signal transmitter unit is in this case electrically connected to the input of the switch to be monitored and the input terminal of the monitoring unit is electrically connected to the output of the switch to be monitored.

The two microcontrollers (MCU—micro controller units) can in this case be designed as integrated circuits, for example, and be designed to generate an AC voltage in the form of temporally varying voltage pulses. However, at least in the signal transmitter unit, the AC voltage is not directly electrically forwarded to the output terminal of the signal transmitter unit by the first microcontroller. Instead, a capacitor that has suitable capacitance is connected between the first microcontroller and the output terminal. This capacitor produces galvanic isolation between the first microcontroller and the output terminal, such that only AC voltage components of a voltage generated by the microcontroller can be transmitted to the output terminal; DC voltage components, however, cannot reach the output terminal. This can prevent DC voltage components, which could potentially contribute to electrical corrosion, also being applied to the input of the switch in addition to the desired AC voltage signal. The capacitance of the capacitor can in this case be proportioned such that the AC voltage signals generated by the first microcontroller, with respect to the frequency thereof, are effectively conducted to the output terminal of the signal transmitter unit.

According to one embodiment, the signal transmitter unit also comprises a protective diode which is connected between an electrical connection of the first microcontroller and the capacitor at one end and an electrical protection potential at the other end. In other words, one end of a protective diode is connected to an electrical line which connects the first microcontroller to the capacitor, and an opposite end of the protective diode is connected to an electrical protection potential, such as the ground. The protective diode is in this case preferably designed and polarized such that potentially present electric charges, such as static charges, can be dissipated and therefore cannot damage the sensitive first microcontroller.

Similarly, according to one embodiment, the monitoring unit can also comprise a protective diode which is connected between an electrical connection of the second microcontroller and the input terminal at one end and an electrical protection potential at the other end, in particular in order to be able to protect the second microcontroller from negative voltages.

According to one embodiment, the elevator system also comprises at least one further switch which is coupled to the switch to be monitored such that the further switch and the switch to be monitored always change their switching states together.

For example, a further switch can be designed to switch high electrical powers in the range of several kilowatts, and thus to actually also switch high electrical powers in the elevator system. However, in a further switch of this kind, in view of the high switched powers, it is often not possible to detect the current switching state thereof without problems. It can therefore be advantageous to provide a switch to be monitored in addition to the further switch. The current switching state of the switch to be monitored is relatively simple to detect. In particular, the circuit described herein, which comprises the signal transmitter unit generating the AC voltage signal, and the monitoring unit can be used for this purpose. If it is ensured that the switch to be monitored always changes its switching state together with the at least one further switch, the current switching state of the further switch can be inferred from measuring the switching state of the switch to be monitored. For example, the switch to be monitored can be mechanically coupled to the further switch such that, when internal switching components of the further switch are shifted, forces are necessarily also exerted on the switch to be monitored and move said switch in order to switch over.

For example, according to one embodiment the further switch can be connected between the drive and a power source supplying the drive. The further switch is used in this case to turn a power supply for the drive of the elevator system on or off. By means of the signal transmitter unit and the monitoring unit, the control means proposed herein can therefore always and with high reliability determine, by means of the switch to be monitored that interacts with the further switch, the current switching state of the power supply that supplies the drive of the elevator system.

According to an alternative embodiment, the switch to be monitored is part of a safety chain of the elevator system. In other words, the switch to be monitored can be a safety switch which monitors, for example, a particular function or a particular state of a component of the elevator system. In this case, the switch to be monitored can form an element of a safety chain.

By means of the combination proposed herein of signal transmitter unit and monitoring unit, it is optionally possible to determine not only the current switching state of a single switch to be monitored, but the switching state of the entire safety chain can also be determined in the case of a safety chain composed of a plurality of switches to be monitored. In this case, the signal transmitter unit and the monitoring unit do not necessarily need to be wired to each individual switch, but it can be sufficient for the two units to contact end contacts of the safety chain, since the individual elements of the safety chain are electrically connected in series with one another.

For example, according to one embodiment the switch to be monitored can be a door switch. A door switch of this kind is typically in the closed state if the car or shaft doors monitored by said switch are correctly closed and locked, and is opened when the doors are not correctly locked and/or begin to open. Similarly to other safety switches, a door switch of this kind is therefore usually a passive element which is switched by an active element, as in this case of the door, such that the current closure state of the door can be inferred from the state of the switch that is reproduced by the monitoring signal.

It should be noted that some of the possible features and advantages of the invention are described herein with reference to different embodiments. A person skilled in the art recognizes that the features can be combined, adapted or replaced as appropriate in order to arrive at further embodiments of the invention.

Embodiments of the invention will be described below with reference to the accompanying drawings, neither the drawings nor the description being intended to be interpreted as limiting the invention.

The drawings are merely schematic and not true to scale. Like reference signs refer in the different drawings to like or analogous features.

DETAILED DESCRIPTION

Figure 1:
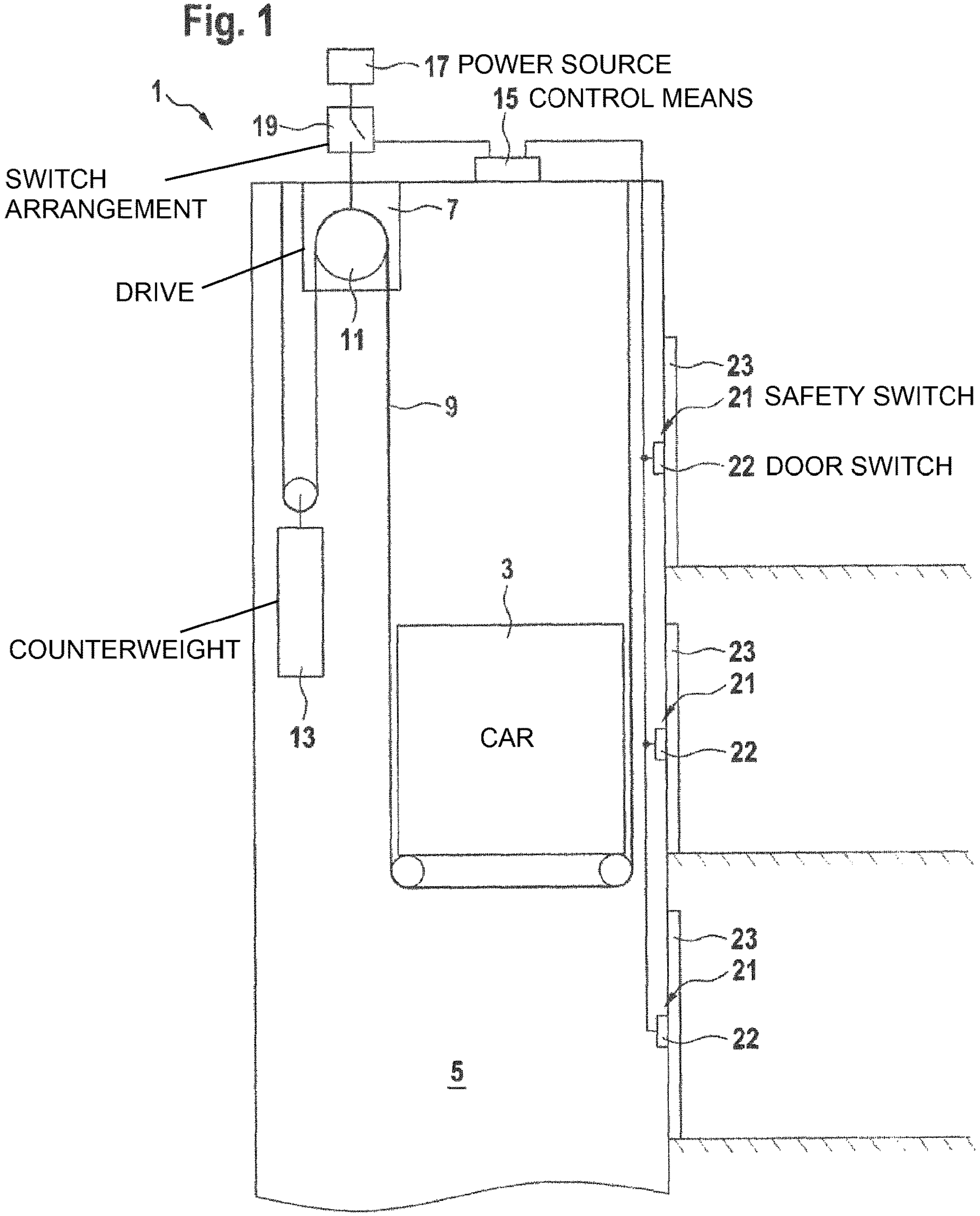
FIG. 1 shows an elevator system.

FIG. 1 shows an elevator system 1 in which an elevator car 3 can be moved inside an elevator shaft 5 by means of a drive 7. The elevator car 3 is in this case held by a cable-like or belt-like bearing means 9. This bearing means 9 is driven by a traction sheave 11 of the drive 7. The bearing means 9 also holds a counterweight 13.

Operation of the drive 7 is controlled by a control means 15. The control means 15 in this case controls a power supply of an electric motor housed in the drive 7 through a power source 17. The power source 17 can be, for example, a multi-phase power terminal, the power supply of which to the drive 7 is controlled by means of a switch arrangement 19. In this case it can be important to detect a current switching state of the switch arrangement 19 and to be able to communicate said state to the control means 15 for control purposes, for example.

The control means 15 is also connected to a plurality of safety switches. Each of the safety switches is designed as a switch 21 and is used, for example, to monitor a particular safety-related state inside the elevator system 1. For example, safety switches can be provided as door switches 22 on shaft doors 23 and monitor a current closure state of an associated shaft door 23. Other types of switches 21, such as shaft end switches, door zone switches, etc., can also be monitored.

Figure 2:
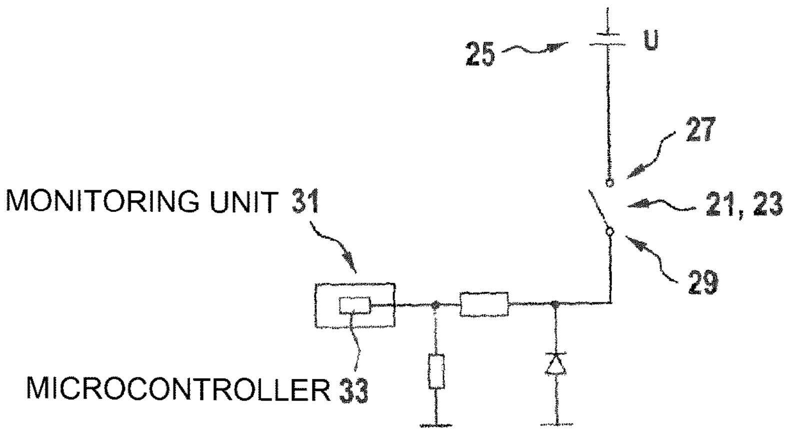
Fig. 2 (Prior Art)
FIG. 2 illustrates conventional monitoring of a switching state of a switch of the elevator system.

FIG. 2 illustrates how a switching state of a switch, in particular a mechanically operating switch 21, is conventionally monitored. An input voltage U of for example 5V is applied, from a voltage source 25, to an input terminal 27 of the switch 21. An output terminal 29 of the switch 21 is connected to a monitoring unit 31 in which a microcontroller 33 monitors the voltage at the output terminal 29. If the input voltage U is measured at the output terminal 29, it is assumed that the switch 21 is closed. In the case of an incorrect voltage at the output terminal 29, it is assumed that the switch 21 is open.

However, continuously applying the input voltage U to the switch 21 can lead, over time, to electrical corrosion on the electrically conductive switching components of said switch. In particular, a corroded switch 21 can lead to voltage not being applied at the output terminal 29 even though the switch 29 is closed. Moreover, short circuits, shunts or the like can lead to voltages that are similar to the input voltage U being applied to the output terminal 29 even though the switch 21 is open.

Figure 3:
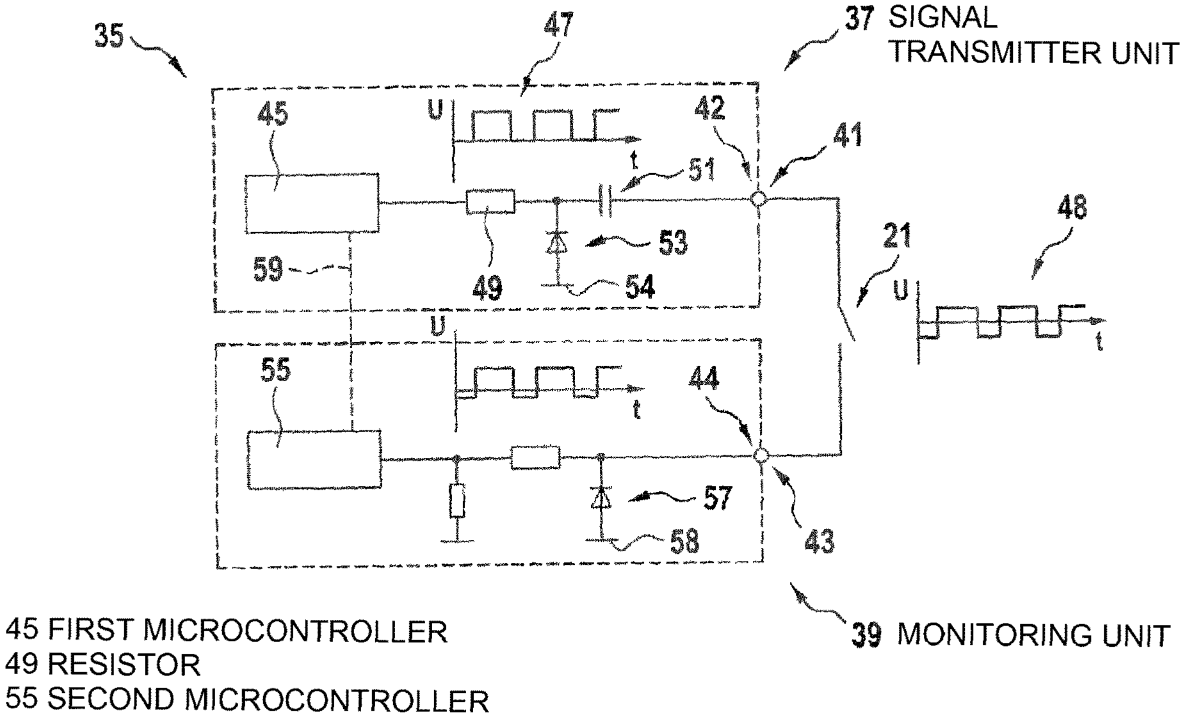
FIG. 3 shows a circuit of a control means of the elevator system according to one embodiment of the present invention.

FIG. 3 therefore shows a circuit 35, as can be integrated for example in the control means 15 of an elevator system 1, and by means of which the switching state of a switch 21 can be reliably monitored and the risk of electrical corrosion can thereby be minimized.

In addition to the switch 21, the circuit 35 has a signal transmitter unit 37 and a monitoring unit 39. The signal transmitter unit 37, the monitoring unit 39 and possibly other units, for example of the elevator control means, can optionally be housed in a common complete unit. The signal transmitter unit 37 is electrically connected to an input 41 of the switch 21. The monitoring unit 39 is electrically connected to an output 43 of the switch 21.

The signal transmitter unit 37 has a first microcontroller 45 which is designed to generate an AC voltage signal 47. The first microcontroller 45 is electrically connected to a terminal of a capacitor 51 via a resistor 49. The second terminal of the capacitor 51 is connected to the input 41 of the switch 21 via an output terminal 42. A capacitance of the capacitor 51 is in this case suitably adapted such that, although the AC voltage signal 47 can pass through the capacitor 51, any DC voltage components cannot occur up to the switch 21.

A protective diode 53 is also provided in the signal transmitter unit 37. One end of this protective diode 53 is connected to the electrical connection of the first microcontroller 45 to the capacitor 51. The other end of the protective diode 53 is electrically connected to a protection potential, for example to a ground potential 54. As a result, the protective diode 53 can prevent static electric charges from being able to damage the first microcontroller 45, for example.

The monitoring unit 39 has a second microcontroller 55. This is electrically connected to the output 43 of the switch 21 via an input terminal 44. A protective diode 57 is also inserted between the electrical connection of the microcontroller 55 to the input terminal 44 at one end and a protection potential such as a ground potential 58, in order to protect the second microcontroller 55 for example against negative voltages.

The second microcontroller 55 is designed to receive and analyze electrical voltages applied to the input terminal 44 thereof, in particular electrical AC voltage signals applied there. In particular, the second microcontroller 55 can be designed to compare the output signals of the switch 21 that are received by said second microcontroller with the AC voltage signals 47 which are applied to the input 41 thereof.

For this purpose, information on the applied AC voltage signals 47 can be stored in the second microcontroller 55, for example saved in a memory. Alternatively, the second microcontroller 55 can be in communication with the first microcontroller 45 via a data connection 59 (shown by a dashed line) and can obtain information from the first microcontroller 45, which information relates to the AC voltage signals 47 applied to the switch 21.

If the second microcontroller 55 of the monitoring unit 39 detects that the output signals applied to the output 43 of the switch 21 substantially correspond to the AC voltage signals 47 applied to the input 41 thereof, it can be assumed that the switch 21 is in its closed state. If, however, a voltage is not applied or only a DC voltage is applied at the output 43 of the switch 21, although the AC voltage signal 47 is applied at the input 41 thereof, it can be assumed that the switch 21 is open or defective.

A time curve of the two signals, in particular a frequency of the two signals, can in this case be considered an essential feature which determines whether the incoming AC voltage signal 47 corresponds to the read-out output signal. A differential signal between the incoming AC voltage signal 47 and the read-out output signal can optionally be analyzed. Any attenuations of the AC voltage signal 47 or superimpositions of additional DC voltage signals can be suitably taken into consideration during analysis or can be disregarded as irrelevant to the decision as to whether the switch 21 to be monitored is closed or not.

In this case it can be assumed that, although any errors in the circuit 35 can lead to it being possible for additional DC voltages to be applied to the output 43 of the switch 21, for example due to short circuits, shunts or the like, errors of this kind mean that it is not possible, when the switch 21 is open, to generate an AC voltage at the output 43 that wrongly "simulates" a closed switch to the monitoring unit 39.

The AC voltage signals 47 are preferably generated by the signal transmitter unit 37 such that an AC voltage signal 48 appears at the switch 21, at which signal the voltage U periodically polarizes so as to have an amplitude that is symmetrical with respect to a 0V potential (zero volt potential). For example, the AC voltage signal 48 can be sinusoidal, rectangular or have any other periodic curve, and can move symmetrically about a time axis t. Times when the AC voltage signal 48 is positive and times when it is negative are in this case substantially equally long, such that any electrochemical reactions can take place repeatedly in alternating directions, but this does not produce an assembly of for example an electrochemically generated oxide layer on electrically conductive structures of the switch 21 to be monitored.

Figure 4:
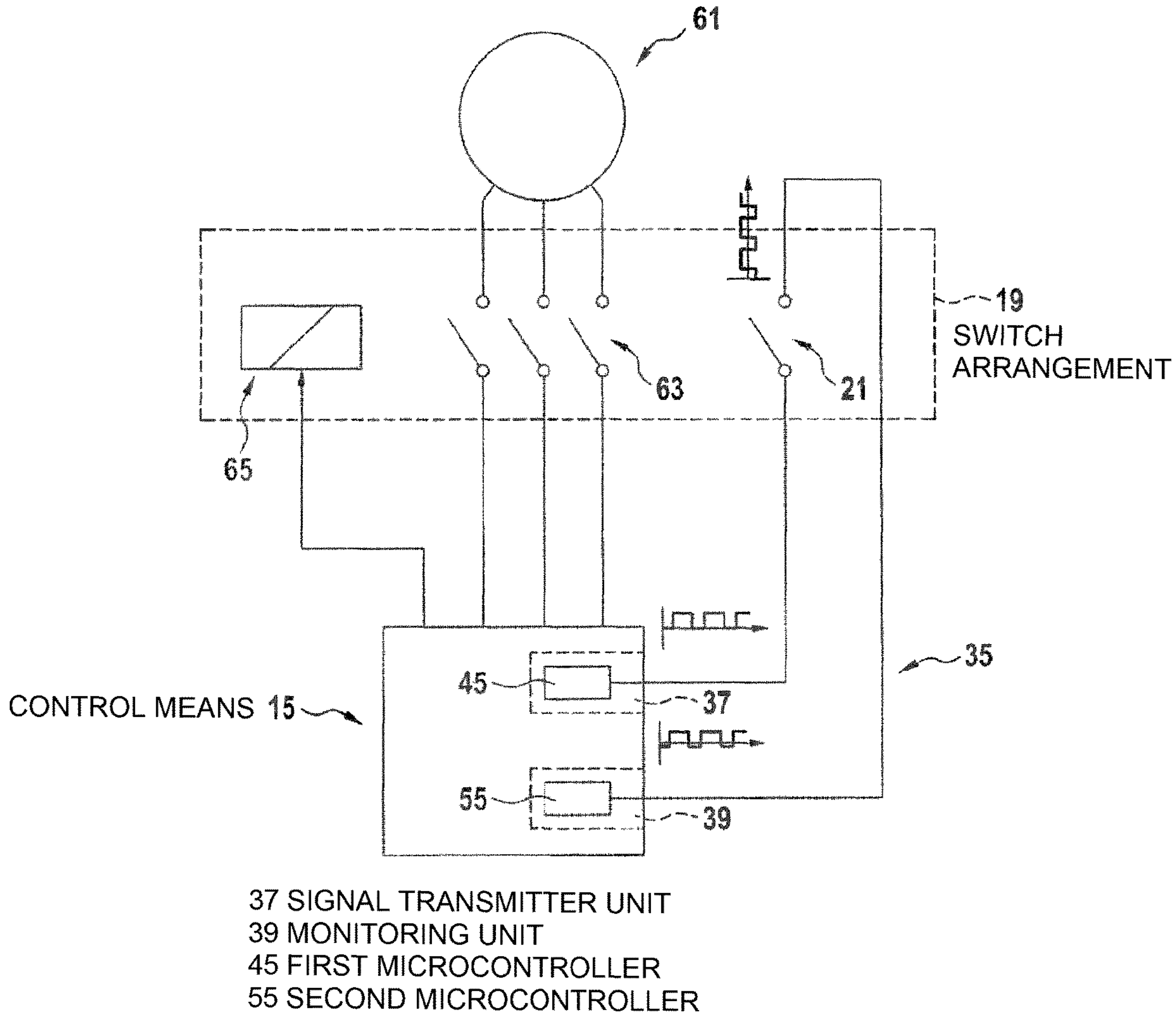
FIG. 4 illustrates a circuit for monitoring a power supply for a drive of the elevator system.

FIG. 4 shows an embodiment which, by means of the switch arrangement 19, controls the power supply to a motor 61 of the drive 7 in an elevator system and can be monitored. The circuit 35 in this case forms part of the control means 15. The signal transmitter unit 37, together with the first microcontroller 45 thereof, and the monitoring unit 39, together with the second microcontroller 55 thereof, can in this case be integrated in the control means 15 (for the sake of clarity, details of the two units 37, 39 are not shown in FIG. 4).

The control means 15 is connected to the switch arrangement 19. A contactor 63 is provided in the switch arrangement 19, by means of which contactor three phases of a power supply can be connected to the motor 61. The contactor 63 that is used as the further switch is switched by a relay 65 that is controlled by the control means 15.

The contactor 63 is coupled to a switch 21 to be monitored such that, in the event that the contactor 63 changes its switching state, the switch 21 to be monitored necessarily also changes its switching state. A switching state of the switch 21 to be monitored can then be simply and reliably monitored in the manner described above by means of the signal transmitter unit 37 and the monitoring unit 39 of the circuit 35 and in so doing electrical corrosion can be prevented.

Similarly to how a single switch 21 is monitored using the circuit 35 in the example shown in FIG. 4, in order to monitor the function or the switching state of a power-switching contactor 63, the control means 15 provided with the circuit 35 can also be used to monitor the switching state of a safety chain in which a plurality of switches 21, such as door switches 22, are connected in series.

Finally, it should be noted that terms such as "comprising", "having" etc. do not preclude other elements or steps and terms such as "a/an" or "one" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system comprising:
- an elevator car;
- a drive driving the elevator car;
- a control means controlling the drive and including a circuit;
- wherein the circuit has a switch to be monitored, the switch having an input and an output;
- wherein the circuit has a signal transmitter unit that applies an AC voltage signal as an input signal to the input of the switch; and
- wherein the circuit has a monitoring unit that receives the input signal and records an output signal applied to the output of the switch and, based on a comparison of the output signal with the input signal, generates a monitoring signal that indicates a switching state of the switch.

2. The elevator system according to claim 1 wherein the signal transmitter unit generates the AC voltage signal with a periodically reversing electrical voltage.

3. The elevator system according to claim 1 wherein the signal transmitter unit generates the AC voltage signal with positive and negative amplitudes that are symmetrical with respect to a 0V potential.

4. The elevator system according to claim 1 wherein the signal transmitter unit generates the AC voltage signal with a temporally varying period.

5. The elevator system according to claim 1 wherein:
- the signal transmitter unit has
  - a first microcontroller generating an electrical signal having a temporally varying amplitude,
  - an output terminal, and
  - a capacitor electrically connected at one end to the first microcontroller and at another end to the output terminal to form a galvanic isolation between the first microcontroller and the output terminal;
- wherein the monitoring unit has
  - a second microcontroller for analyzing the electrical signal having a temporally varying amplitude, and
  - an input terminal electrically connected to the second microcontroller; and
- wherein the output terminal of the signal transmitter unit is electrically connected to the input of the switch and the input terminal of the monitoring unit is electrically connected to the output of the switch.

6. The elevator system according to claim 5 wherein the signal transmitter unit includes a protective diode connected between an electrical connection of the first microcontroller to the capacitor at one end and an electrical protection potential at another end.

7. The elevator system according to claim 5 wherein the monitoring unit includes a protective diode connected between an electrical connection of the second microcontroller to the input terminal at one end and an electrical protection potential at another end.

8. The elevator system according to claim 1 wherein the switch switches low electrical powers of less than 50 W.

9. The elevator system according to claim 1 wherein the switch is a mechanical switch.

10. The elevator system according to claim 1 including at least one further switch coupled to the switch wherein the at least one further switch and the switch always change switching states together.

11. The elevator system according to claim 10 wherein the at least one further switch is connected between the drive and a power source supplying the drive.

12. The elevator system according to claim 1 wherein the switch is part of a safety chain of the elevator system.

13. The elevator system according to claim 12 wherein the switch is a door switch.

14. An elevator system comprising:

an elevator car;

a drive driving the elevator car;

a control means controlling the drive and including a circuit;

wherein the circuit has a switch to be monitored, the switch being part of a safety chain of the elevator system, and the switch having an input terminal and an output terminal;

wherein the circuit has a signal transmitter unit connected to the input terminal, the signal transmitter unit applying an AC voltage signal as an input signal to the input terminal; and wherein the circuit has a monitoring unit connected to the output terminal, the monitoring unit receiving the input signal and recording an output signal at the output terminal and, based on a comparison of the output signal with the input signal, generating a monitoring signal that indicates a switching state of the switch.

* * * * *